Feb. 23, 1971 H. R. WORTHINGTON, JR., ET AL 3,566,370
AUTOMATED MEDICAL HISTORY TAKING SYSTEM
Filed June 10, 1969 8 Sheets-Sheet 1

FIG. 1

INVENTORS
HARVEY R. WORTHINGTON, JR.
DANIEL B. SCHWARZKOPF

ATTORNEYS

United States Patent Office 3,566,370
Patented Feb. 23, 1971

3,566,370
AUTOMATED MEDICAL HISTORY TAKING SYSTEM
Harvey R. Worthington, Jr., Cambridge, and Daniel B. Schwarzkopf, Stow, Mass., assignors to Searle Medidata, Inc., Waltham, Mass., a corporation of Delaware
Filed June 10, 1969, Ser. No. 831,930
Int. Cl. G06f *15/02, 15/42;* G03b *23/06*
U.S. Cl. 340—172.5                                    12 Claims

ABSTRACT OF THE DISCLOSURE

An automated real time system for taking a detailed medical history of a patient. This system comprises a console by which questions are propounded under computer control in a manner responsive to answers given and the history data is assembled and printed out in narrative form for use by the physician.

FIELD OF THE INVENTION

This invention relates to data compiling and processing systems and more particularly to real time systems for adaptively collecting data concerning a patient's medical history and for processing this data either locally or at a remote point.

BACKGROUND OF THE INVENTION

An accurate and complete medical history of a patient is of critical importance to a physician in order to provide him with sufficient information from which to make a sound diagnosis of a patient's condition. The medical history is usually taken by the physician or by a skilled medical interviewer and considerable time is spent in interviewing the patient and recording his responses to questions. The documentation of the completed medical history similarly requires a considerable amount of time, especially if the data is to be stored in a data processing system for later recall. Systems are in use for recording files of patients' medical histories in a hospital or clinic, for example, and medical history data must be transformed or translated into a form suitable for entry into a data processing system so that it is later available for selective read-out.

SUMMARY OF THE INVENTION

Briefly, the present invention provides an automated real time history taking system which is effective to interrogate a patient in such a manner that subsequent questions are responsive to answers to earlier questions propounded, and to process the answers in a manner to provide a narrative read-out of the medical history similar in format to medical reports favored by physicians. The history may be taken at a site locally associated with a teletypewriter output station or may be remote from such station. The history taking apparatus or console may be located in a doctor's office and connected via a suitable communications links such as a telephone line to a data processing center. The data processing center may be operative to communicate with a plurality of similar history taking stations. In such a remote mode of operation, a printed narrative output of each patient's history can be provided by mail or otherwise directed to the physician in question.

The history taker includes a console having a viewing screen on which are presented successive questions to be answered together with a plurality of possible answers. Controls are provided for operation by a patient whereby he may select one or more of the possible answers to a particular question. He may also control the operation of the console to repeat a previous question or to go on to a succeeding question. Identification of the patient is provided by a coded identity card, much like a credit card, which may be inserted into the console to cause the recordation of the patient's identification number so that data thereafter assembled is associated with the proper person.

The medical history is taken by means of a programmed question-and-answer format wherein questions are presented which are responsive to particular answers given by the patient in response to prior questions. Thus, a particular line of inquiry can be extended as required by the patient's responses. All answers are stored, formatted and printed out at a predetermined time preferably in narrative form for use by the physician. The history taking is completely automated and the services of a skilled interviewer are not, therefore, required. Questions may be presented in any language to accommodate the native tongue of the patient being treated and may also be presented in pictorial form for children or illiterates. The facility with which the complete medical history of a patient can be developed makes the system especially useful in clinics and out-patient departments of hospitals, and enables more adequate examination of patients than can presently be conveniently accomplished by reason of lack of sufficient time and trained personel.

DESCRIPTION OF THE DRAWINGS

The invention will be more fully understood from the following detailed description, taken in conjunction with the accompanying drawing, in which.

DESCRIPTION OF THE PREFERRED EMBODIMENT

History taking console

With reference now to the drawing, and more specifically FIG. 1 through FIG. 5 thereof, there is shown a medical questionnaire console 102 which is an integral part of the history taking system of this invention. This console may be coupled to a remote data processor by appropriate means such as telephone 104 and acoustic coupler 106. Alternatively, the console could be coupled to a remote data processor by a radio link or by a hard line. The console houses a slide projector 108 with appropriate cooling means, a mirror system generally referred to by reference numeral 110, and is equipped with a slot 112 for insertion of a patient identity card, a projection screen 114 for visual presentation of data to a patient seated therebefore, control buttons 116 and answer buttons 118.

Figure 1:
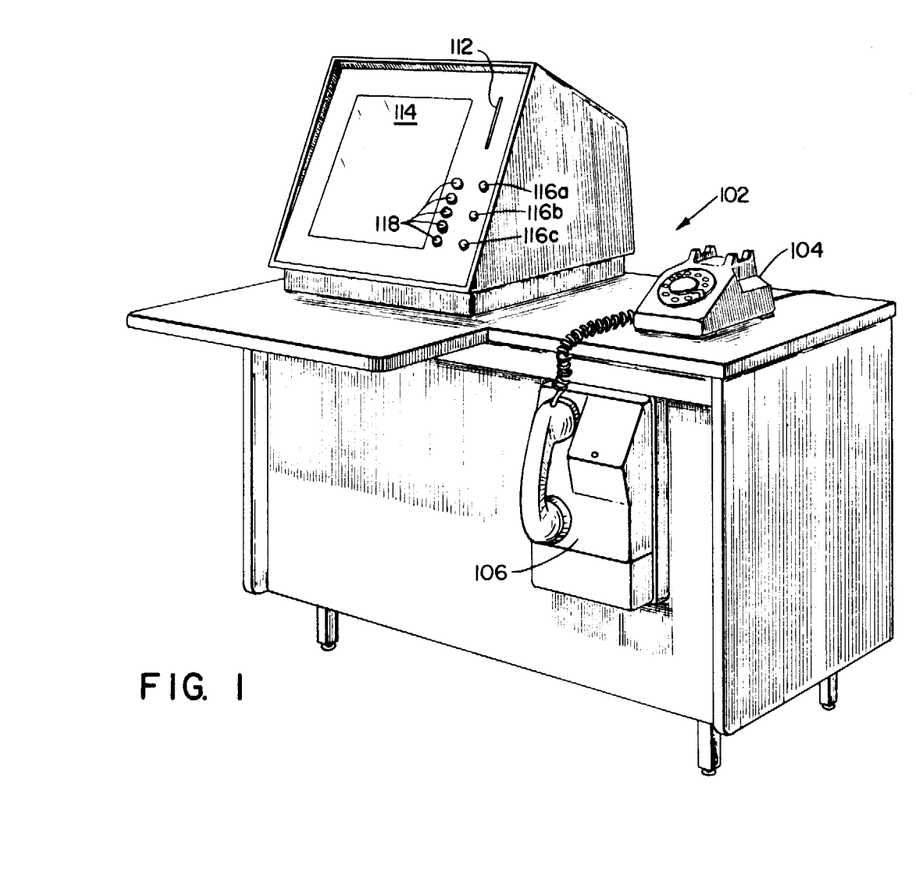
FIG. 1 is a perspective view of the history taking console which is a part of the history taking system of this invention.

In response to control signals from a logic system which is further described in detail hereinbelow, slide projector 108 provides data for display on projection screen 114. The data from a slide in projector 108 is transmitted through a unique lens and shutter assembly 120 and is projected onto mirror system 110 for reflection onto screen 114 from the underside thereof.

Figure 2:
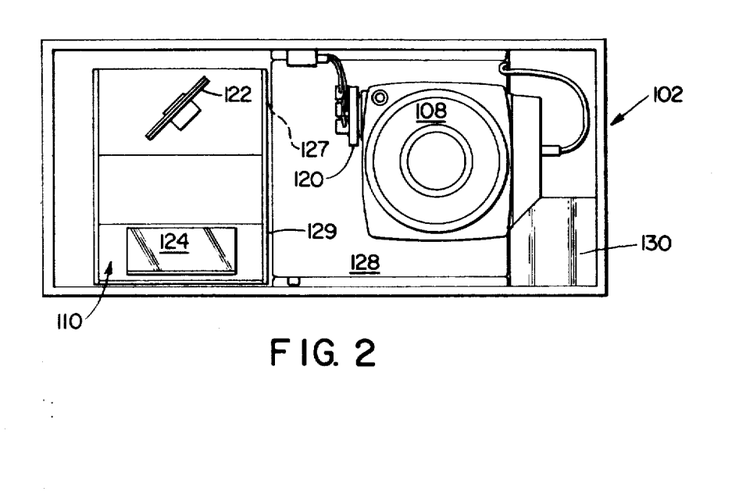
FIG. 2 is a plan view of the console of FIG. 1 with the top cover and projection screen removed.

Mirror system 110 comprises a set of plane mirrors 122, 124, 126 in a sub-chassis or mirror box. The image from the projector passes through opening 127 in side wall 129 of the mirror box and is reflected 90° in a horizontal plane by mirror 122. The image is then reflected in a vertical plane by mirror 124 and then onto the inner surface of projection screen 114 by mirror 126. The image thus appears in front of the patient in proper orientation to be easily viewed. It is readily apparent from the drawing that an image directed upon mirror 122 in an upright orientation will be reflected through mirror system 110 to appear in that same orientation on projection screen 114.

In operation the insertion of a patient identification card into the console via slot 112 causes energization of the projector lamp and blower of slide projector 108 and can also provide energization of the console logic, although a separate power switch may be employed for this purpose. Upon commencing operation, a slide, and a portion or quadrant thereof containing introductory material is automatically selected by the system logic and is projected onto screen 114 to explain operation of the console to the patient. A succession of practice questions and answers may be provided to familiarize the patient with operation of the console prior to initiation of the actual examination. The questions are presented with multiple choice answers, each answer associated with a respective answer button. In the illustrated embodiment five answer buttons 118 are provided adjacent screen 114 and accordingly up to five answers can be presented for each question. The console controls include a button 116a operative to cause presentation of the next data frame, a button 116b to cause the previous data frame to be presented on screen 114 and a third button 116c for erasing a previously recorded answer in the event that the patient desires to change his answer to a particular question. The control and answer buttons contain suitable lamps for indicating actuation of the respective buttons. The questioning continues in a sequence governed by the answers of the patient so that a particular line of inquiry can be extended as required by the patient's responses. At the end of the questioning sequence, that is, after presentation and answering of all appropriate data frames, the system may, if desired, automatically switch to a printout mode wherein the patient's answers are assembled and formatted so that the printed medical history report is in narrative form for use by the physician.

PROJECTION APPARATUS

Figure 3:
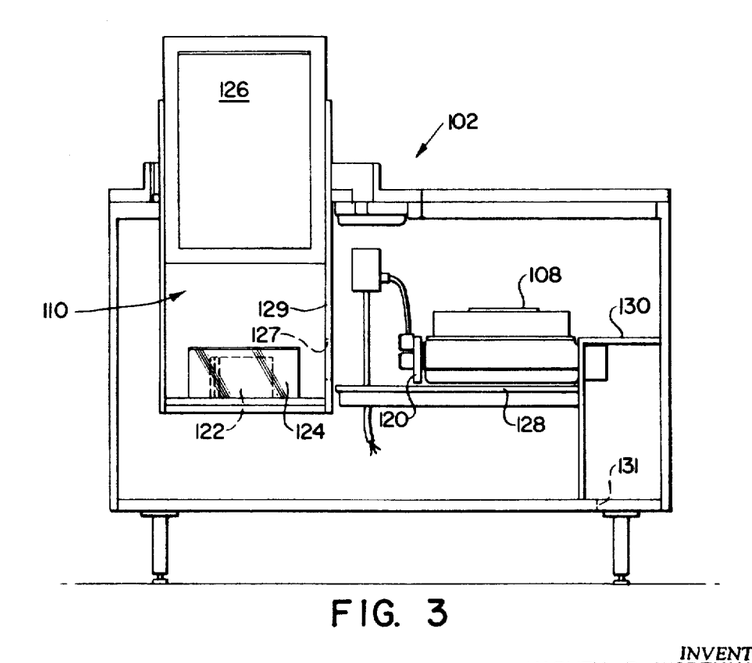
FIG. 3 is a front elevational view of the console of FIG. 1 with the front panel removed.
Figure 4:
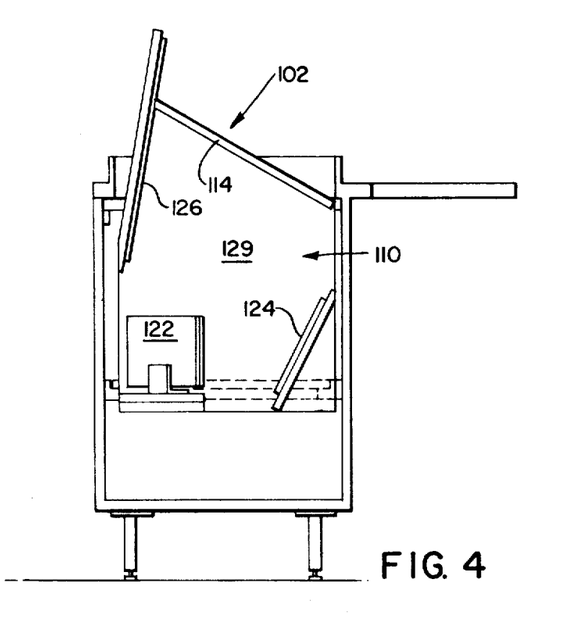
FIG. 4 is a left end view of the console of FIG. 1 with the left end panel removed.
Figure 5:
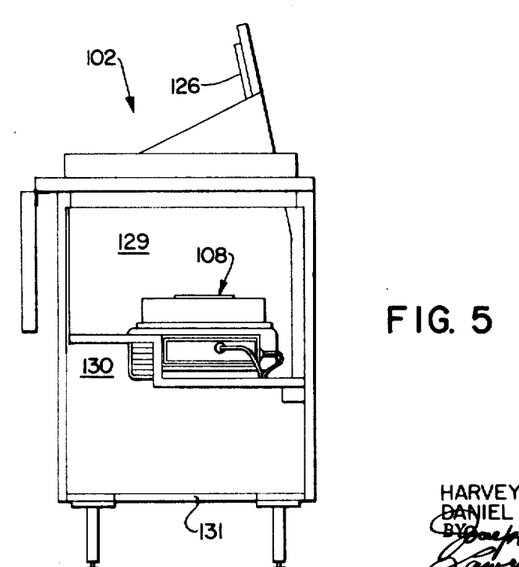
FIG. 5 is a right end view of the console of FIG. 1 with the right end panel removed.

In describing the projection apparatus generally, reference will be made primarily to FIG. 6 of the drawing. A slide projector 108 having a capacity of many slides which are randomly accessible is generally desired for use with this medical history taking system. A projector which has been found suitable is sold by the Eastman Kodak Company under the designation "Kodak Carousel RA–950 Projector." This projector retains slides in a rotary movable magazine and has associated circuitry for randomly accessing any of the stored slides. The magazine is capable of storing 80 slides, any of which may be selected for projection through the use of proper control signals, which signals are produced by means of the electronic system described hereinbelow under the heading Logic System. Slide projector 108 is shown in FIG. 3 mounted within console 102 on platform 128, its exhaust blower being arranged to direct heated exhaust air into appropriate ducting as indicated by reference numeral 130 and then out the bottom of the console through opening 131. This ducting may direct the exhaust air downwardly or rearwardly as desired from console 102. According to the invention, the slides are each arranged with multiple sectors of data and the slide projector employs a unique multiple sector projection lens and shutter assembly 120 operative to project any selected one of the sectors of each selected slide. In the illustrated embodiment, each slide is divided into four quadrants and lens and shutter assembly 120 includes a four lens array. Each lens of the array is arranged to focus one of the four quadrants of a slide selected for display and the shutter portion of the mechanism is so constructed as to be capable of selecting one of the quadrants of the slide for projection at any particular instant in time. This arrangement of quadrature separated slides together with the unique lens and shutter assembly allows the effective slide capacity of any slide projector magazine to be quadrupled. For example, the projector shown in FIG. 6 has an 80 slide magazine, which, with this device, provides 320 different slide images, any one of which is accessible at any time.

Lens and shutter assembly 120 is constructed to replace the single lens conventionally employed with the slide projector and has a comparable degree of magnification while utilizing the existing illumination of the projector. No significant structural modification of the projector itself is required. With proper controls as described herein, not only are the slides themselves available in random access manner, but so also are the various quadrants on any given slide. The fact that the quadrants of the slide are randomly accessible may, in some applications, obviate the necessity for having random access to different slides and thereby permit the use of a less expensive projector. This would contemplate an arrangement where the random accessibility to the slide quadrants provides sufficient flexibility of image projection so that a group of slides may otherwise be shown in a predetermined sequence by the projector.

It is thus apparent from the foregoing description that projector 108 is capable, with the electronic control later described, of projecting any of 320 different images on screen 114 of console 102 where the projector has a capability and a magazine capacity of 80 slides. Different types of projectors may have slide magazines of different capacities, in which case, the number of different images available will be four times the number of slides which the projector magazine is capable of storing. Of course, the slides and the lens and shutter assembly need not be strictly limited to only quadrature operation, it being possible that suitable modifications could be made for different numbers of sectors to be utilized.

LENS AND SHUTTER ASSEMBLY

Figure 7:
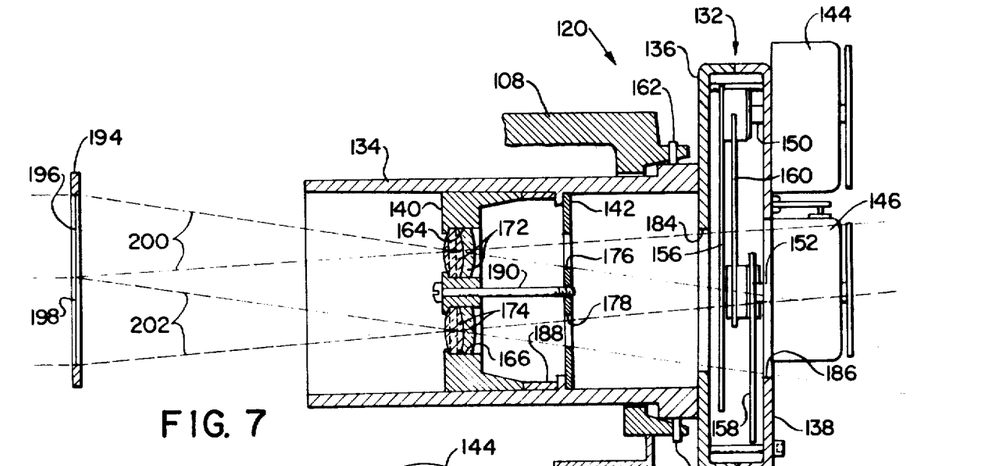
FIG. 7 is an enlarged sectional view taken through cutting plane 7—7 of the lens and shutter assembly of FIG. 6.

The details of construction and operation of lens and shutter assembly 120 are shown in FIGS. 7–11. In FIG. 7 it may be seen that the structure basically comprises lens barrel 132 a shutter housing 134 having a rear housing plate 136 and a front housing plate 138, lens mounting cylinder 140 and aperture disc 142. Mounted externally of housing 134 on housing plate 138 are three rotary solenoids 144, 146 and 148 having respective shafts 150, 152 and 154 extending rearwardly through housing plate 138. Secured to these respective shafts for rotation therewith are shutter vanes 156, 158 and 160. Lens barrel 132 is firmly secured to carousel frame 108 in proper orientation to slide quadrants by means of set screws 162. When the focus of the lens assembly is to be adjusted, set screws 162 are loosened and focus adjusted in the normal manner by moving the lens barrel longitudinally. When the focus adjustment has been completed, set screws 162 are again tightened to secure the lens barrel in place. Lens mounting cylinder 140 (FIG. 9) is formed with four openings 164, 166, 168 and 170. Each of these openings contains an achromatic lens such as lenses 172, 174 in openings 164, 166 respectively, as shown in FIG. 7. The lens may, for example, be a cemeneted doublet or a multi-element lens. Aperture disc 142 (FIG. 10) is formed with four openings 176, 178, 180 and 182 which are aligned with the respective openings in lens mounting cylinder 140 as would result from superimposing FIG. 10 onto FIG. 9. Rear housing plate 136 is formed with substantially square opening 184 which aligns with, but is slightly smaller than, opening 186 in front housing plate 138. Lens mounting cylinder 140 and aperture disc 142 are mounted within lens barrel 132 on opposite sides of annular ridge 188 therein and are firmly held in place by means of bolt 190.

Figure 11:
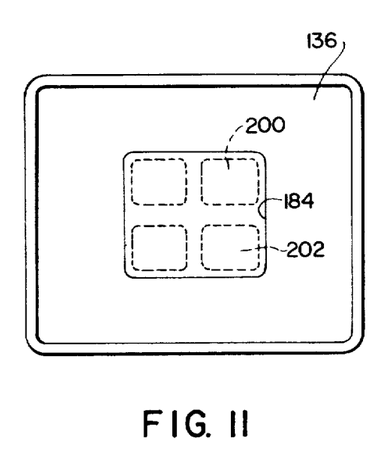
FIG. 11 is a front view of the rear plate of the shutter assembly, showing the image beams as they would appear if sectioned at that point.
Figure 12:
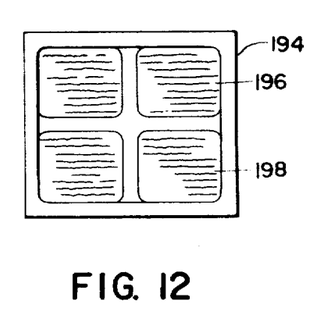
FIG. 12 shows a slide for use with the slide projector of FIG. 6.

A slide 194 having four distinct quadrants with different information in each quadrant is shown in FIG. 12. Since the means for producing images from the information in any other quadrant, only quadrants 196 and 198 and their associated optics will be discussed in detail herein. It may thus be seen that a bundle of light rays 200 originating behind slide 194 by a source of light (not shown) travels through quadrant 196 conveying the information imprinted therein. This beam of light is focused by means of lens system 172, passes through opening 176 in aperture disc 142, through opening 184 in rear housing plate 136, through opening 186 in front housing plate 138 and onto projection screen 114 after passing through mirror system 110 as described above. Similarly, light beam 202 transmits the information from quadrant 198 through lens system 174, aperture disc opening 178, rear housing plate opening 184, front housing plate opening 186 and onto the screen. A cross section of these light beams at opening 184 is shown in FIG. 11. The optical arrangement is such that when the images of the respective quadrants are focused onto the screen, these quadrants all occupy the same area, thus allowing one slide quadrant to be superimposed upon another if desired and if suitable modifications are made to the shutter assembly. This means also that the images projected onto the screen always appear in the same position thereon.

Figure 8:
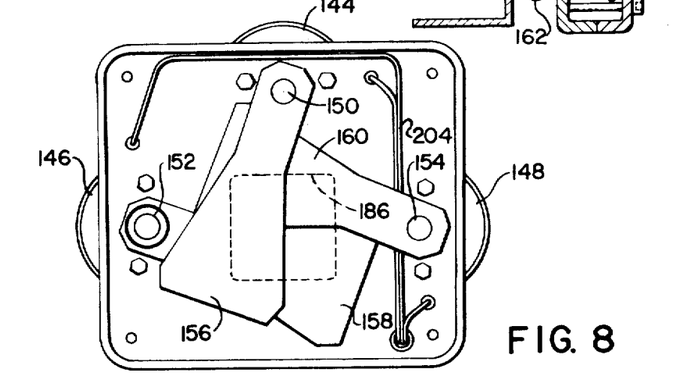
FIG. 8 shows the shutter assembly from behind the front cover plate of FIG. 7.
Figure 9:
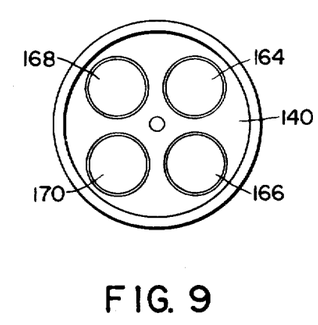
FIG. 9 shows the lens mounting cylinder of the lens and shutter assembly.
Figure 10:
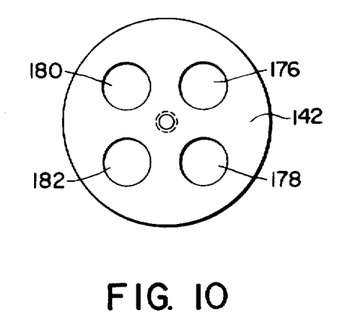
FIG. 10 is a front view of the aperture disc of the lens and shutter assembly.

The choice of the particular quadrant being focused upon the screen at any given time is controlled by the position of shutter vanes 156, 158, 160, which are in turn controlled by solenoids 144, 146, 148. The particular orientation of the vanes in FIG. 8 prevents any light from the projector from passing through opening 186 in front housing plate 138. In this regard it should be stated that each shutter has two positions separated by an angular distance that is substantially the same as the angular width of the sector-shaped blade. In the initial position one edge of the blade lies parallel to the center line of the aperture, and the blade obstructs slightly more than half of the aperture. In the other position the blade obstructs the other side of the aperture in a similar manner. With reference to FIG. 8 all of the shutters are shown in their first positions. If shutter 156 were rotated counterclockwise to its second position and shutter 160 rotated counterclockwise to its second position, the bundle of light rays 200 corresponding to the information in quadrant 196 of slide 194 would be transmitted through the then exposed portion of opening 186. With vane 156 unchanged and vane 160 allowed to return to its initial position, shutter vane 158 may be rotated counterclockwise to its second position to expose a portion of opening 186 to allow the bundle of light rays 202 containing the information from quadrant 198 of the slide to pass therethrough. It may thus be seen that this arrangements allows any quadrant of a slide to be selectively projected onto a screen.

The electrical controls associated with solenoids 144, 146, 148 are so arranged that the entire opening 186 is occluded each time a projected quadrant is changed. Although this is not necessary for the operation of the lens and shutter arrangement, it is psychologically desirable so that the person whose history is being taken will observe that the slide is being changed. If, for example, there were not a short period without any information on screen 114, the patient might not observe that the slide had been changed, since the information displayed on successive frames may be quite similar in appearance.

Figure 6:
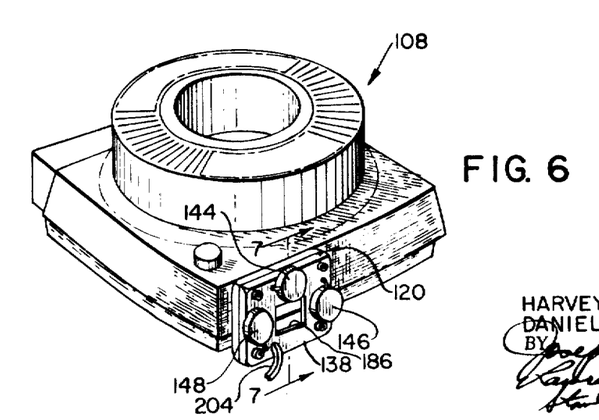
FIG. 6 is a perspective view of a slide projector as modified for use in the system of this invention.

The wires carrying the electrical signals from the control means to the solenoids are shown in FIGS. 6 and 8 and indicated by reference numerals 204. Each solenoid is independently controlled as to the position of its associated shutter by the logic circuitry to be described hereinbelow.

LOGIC CIRCUITRY

Figure 13:
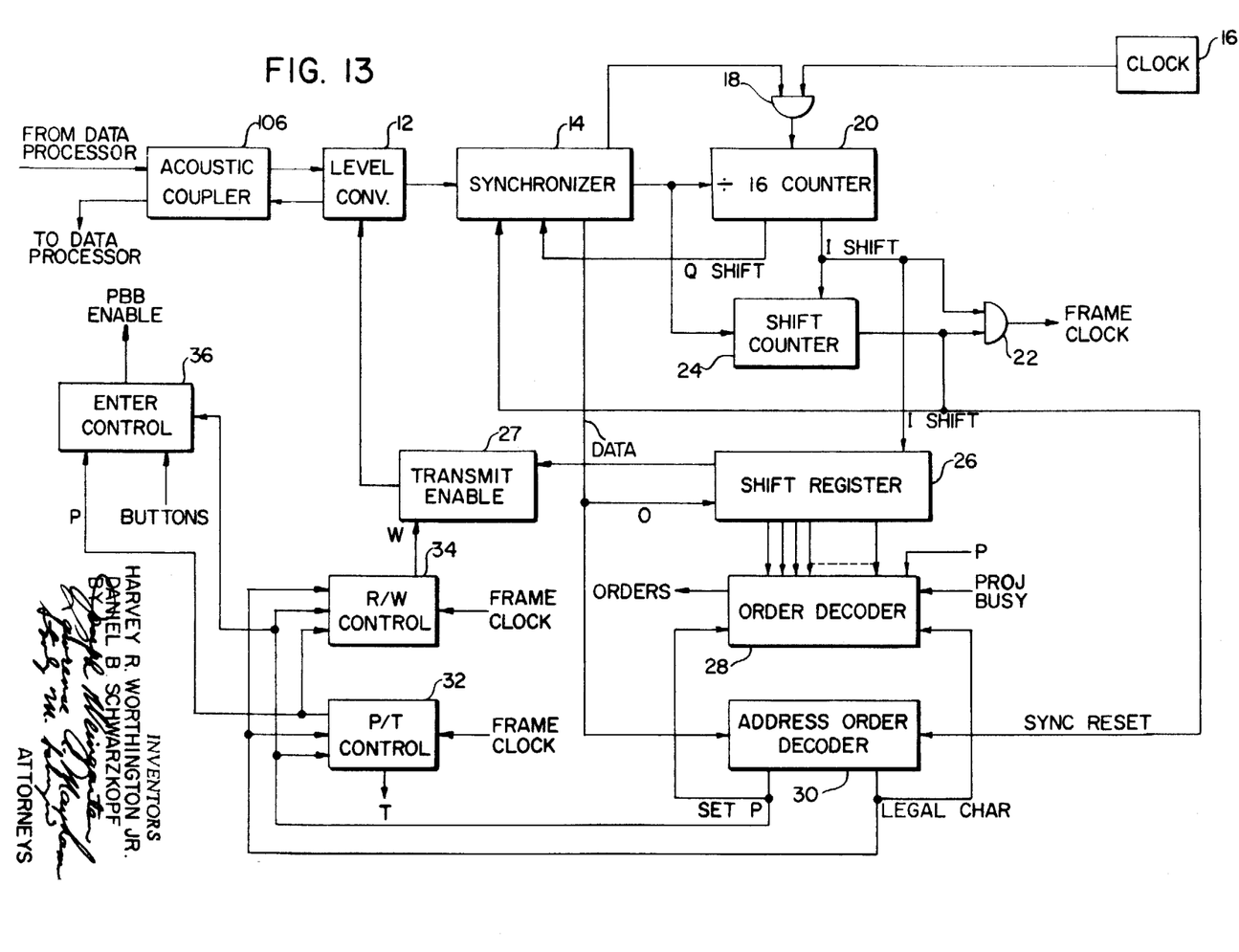
FIGS. 13 and 14 are block diagrams of the system logic circuitry.
Figure 14:
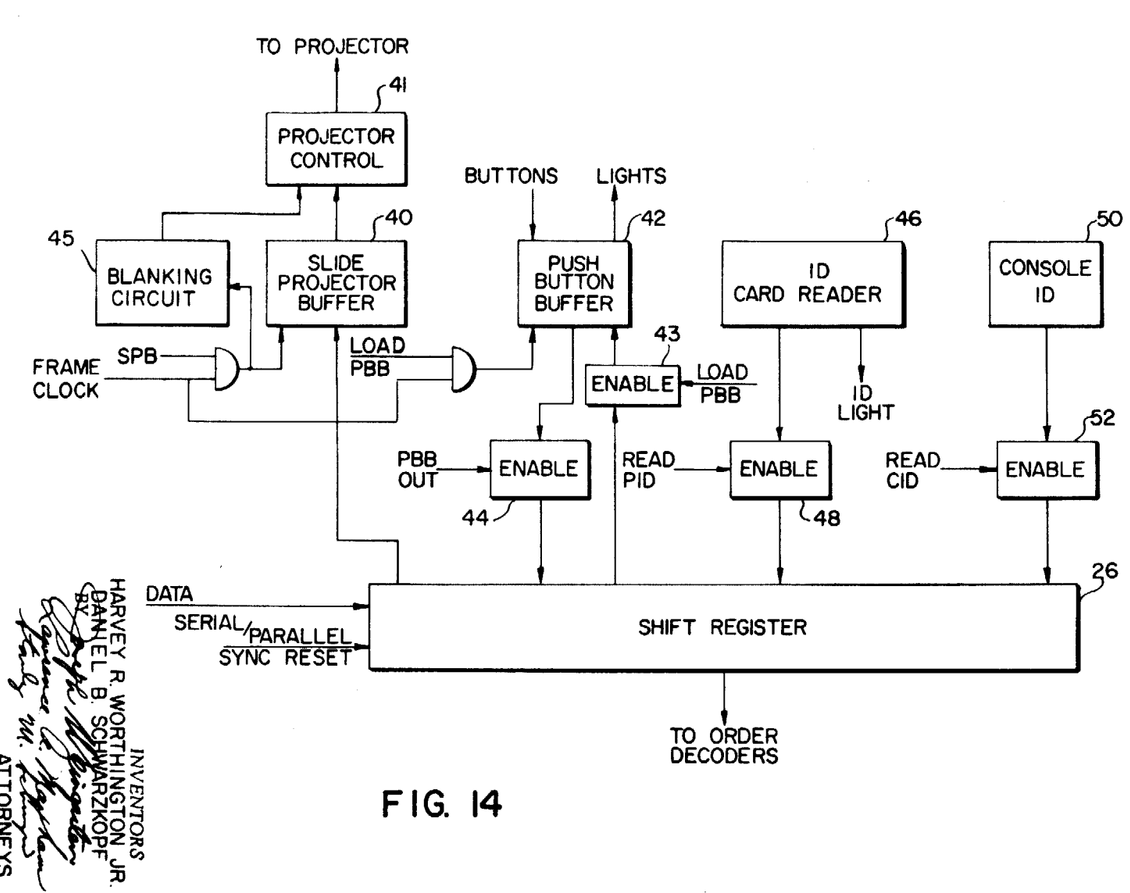
Figure 15:
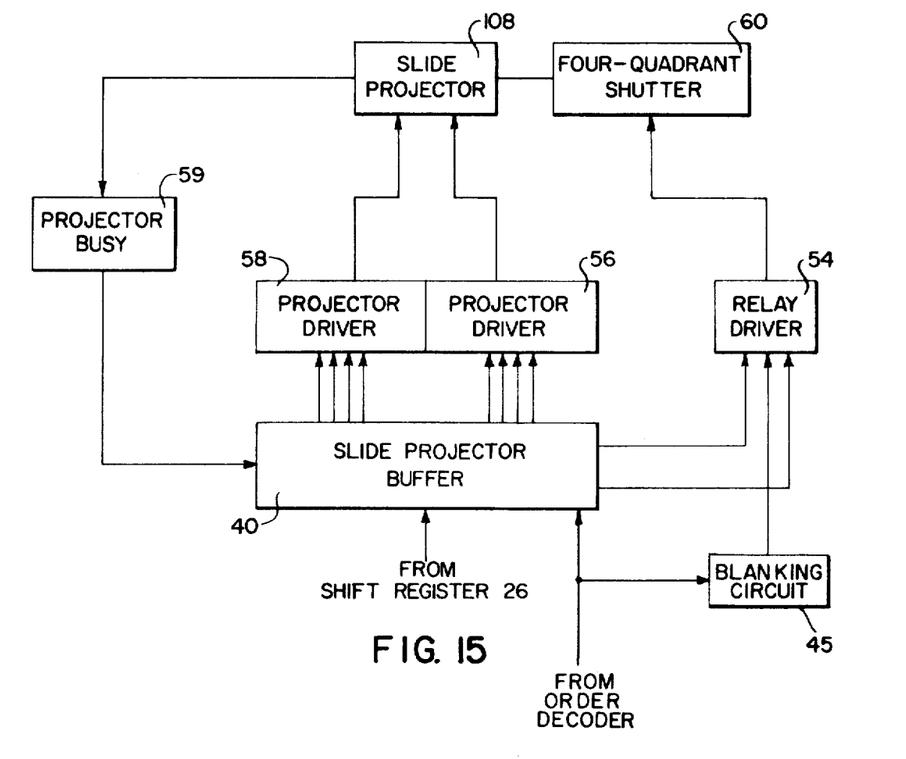
FIG. 15 is a more detailed block diagram of the slide projector portion of the logic circuitry.

The logic circuitry employed with the station console is illustrated in FIGS. 13–15 and includes all circuitry necessary to operate the console and to transfer information to and from the data processor. Upon insertion of the patient identity card into the slot 112 provided in the console the patient identification number is decoded by card reader 46 and the decoded output applied to the shift register 26 in the station logic. Insertion of the patient identification card also causes activation of the station logic to allow data to be entered into the shift register for processing. Operation of the console switches cause data to be entered into push button buffer 42 and thence to the requisite bit locations of shift register 26. The presentation of questions is controlled by information from the processor temporarily stored in shift register 26, this information being transferred by way of slide projector buffer 40 to a projector control 41 and thence to the slide projector for presentation of the desired sector of the appropriate slide on the console screen. The station is in closed loop configuration with the central processor so that instructions can be given to the patient and his responses processed by the processor in real time.

The console contains all logic necessary to decode instructions from the data processor for operation of the console and for encoding information at the console to be transmitted to the data processor. Referring to FIG. 13, data from the computer is entered into the system by means of an acoustic coupler 106 and level converter 12 and applied to a synchronizer 14. Acoustic coupler 106 is of course employed when the system is used with a remote computer coupled to the system via a telephone line as shown in FIG. 1. If the history taking system is located proximate to the data processor or if a hard line is available to the remote processor, data can be entered directly to level converter 12 without the need of acoustic coupling into a telephone line. Level converter 12 provides conversion of the input signal levels, which typically are −6 and +6 volts signals, to signal levels appropriate for the logic employed. In the illustrated system, for example, logic levels of 0 and +5 volts are employed to denote logical 0 and 1 respectively. Synchronizer 14 is operative to receive data words transmitted from the data processor, to enable the system timing circuitry and to transfer the data for decoding upon recognition of a valid data format. According to the particular data format employed in the present system, each sync bit is followed by ten data bits and synchronizer 14 is operative to recognize this data format and to initiate decoding of the data word upon such recognition. The timing circuitry includes a clock 16, the output of which is coupled by means of AND gate 18 to a divide-by-sixteen counter 20, a second input to the AND gate being provided from synchronizer 14. Clock 16 runs at sixteen times the bit rate which in the present system is typically 110 bits per second. Counter 20 is operative to provide an I-shift output pulse at the bit transition time of each incoming pulse, and a Q-shift output pulse at the midbit position of each incoming pulse. The I-shift output is applied to shift counter 24 and to one input of AND gate 22, which is also coupled to shift counter 24, to provide a frame clock output which appropriately times the system data transfer. Shift counter 24 is operative to detect an assembled word and to provide an output pulse for each word thus detected.

The data word is entered into shift register 26 in response to recognition of a valid data word by synchronizer 14, and in response to an I-shift, pulse data is transferred to the order decoder 28 and address order decoder 30 which are operative to decode the selected instructions which are then applied to respective portions of the system. The logic is operative in a P-mode to control operation of the slide projector by which questions are propounded to the patient. The system is also operative in a T-mode in which data previously entered into the data processor is retrieved and printed out on a teletypewriter or other suitable printout device. A P/T Control 32 is operative to provide selection of the appropriate data mode. A read/write control 34 governs whether data is being read from or written into the data processor. An enter control 36 becomes operative when the system is in the P-mode and enables the push button buffer for entry of data by the patient by means of the console buttons. Data is directed to the data processor from shift register 26 via an enable gate 27, actuated by a write commond from read/write control 34, and thence to level converter 12 and coupler 106.

The entry of data derived from the console for encoding and transmission to the data processor, and for decoding of orders from the processor and display on the system console is accomplished by the circuitry illustrated in FIG. 14. A slide projector buffer 40 is coupled from shift register 26 to the projector control 41 which governs operation of the slide projector. Buffer 40 is enabled by an appropriate order (SPB) derived from order decoder 28. A push button buffer 42 receives data from the console buttons and transfers this data to shift register 26 via an enable circuit 44 which is activated by an appropriate interrogate order (PBB out). This order is generated by actuation of the console buttons 116a and 116b. Data is transferred from shift register 26 to buffer 42 by means of enable gate 43 activated by a load PBB instruction from order decoder 28. This latter command illuminates appropriate console lights for the patient's edification. A card reader 46 is provided to read the patient identification card inserted in the console as described hereinabove and to transfer the coded identification number to shift register 26 by way of an enabling circuit 48 energized by an appropriate order (read PID). Card reader 46 is also operative to energize a console ID light which denotes that a patient identification card has been inserted in the console. A console identification circuit 50 is provided to transfer a console identification number by way of an enable circuit 52 energized by a command (read CID) to shift register 26 to provide in the encoded data word an indication of which console is operative. The console identification can be provided by wired logic, or a coded card could be provided similar to that employed for patient identification. The identity of the particular console is useful when a plurality of history taking stations are employed with a single data processor so that data associated with one console can be correlated with that console by means of the identification number.

The slide projector control logic is illustrated in greater detail in FIG. 15 and includes the slide projector buffer 40 which is operative to provide a ten bit output. Two bits provide quadrant information to relay driver 54 for suitable actuation of the solenoids of the four quadrant shutter 120 for selection of one frame of information for projection onto the console screen. Blanking circuit 45 causes control of the shutters such that the four quadrant shutter 120 blanks the screen each time data is transferred to slide projector buffer 40. The remaining eight bits provide projector control in order to select one of the slides contained within the projector magazine. As mentioned hereinabove, the illustrated embodiment employs a Kodak Carousel RA-950 random access slide projector. Projector drivers 56 and 58 employ a data technique operative to uniquely select one slide out of 80 in any random manner with minimum circuitry. The four bit word applied to driver 56 provide low order nonade information while the four bit word applied to driver 58 provides high order nonade information. The low order nonade information represents a number from 0 to 8, and it will be appreciated that the addition of each possible combination of numbers represented by the low and high order nonades will provide numbers from 0 to 80. Thus, the projector drivers 56 and 58 are operative to cause selection of a unique one of the 80 slides in response to particular input control words. The slide carrier has 81 slide positions but, it will be appreciated, one position is employed as a zero position for removal of the carrier from the projector. Detailed description of the decoding logic of the random access projector is not necessary for the understanding of the present invention but such detailed information is available in a publication of Eastman Kodak entitled "Special Applications of the Kodak Carousel RA-950 Projector." The projector logic is operative to select one out of 80 slides and to select one of the quadrants of the selected slide in order to project the information on the selected quadrant frame onto the console projection screen. When slide projector 108 is slewing from one slide to another, data should not be entered into buffer 40 since such data is incapable of being suitably processed while the projector magazine is in motion. To prevent such entry of data, projector busy logic 59 is activated during motion of the magazine of slide projector 108 to inhibit the entry of data into buffer 40 during magazine movement and directs a special character back to the data processor to indicate that this data has not been transferred to buffer 40. During operation, the system remains in the P-mode throughout the examination, at the conclusion of which the system switches to the T-mode upon suitable command from the data processor and begins printout of the data assembled during the examination. After completion of the printout the system returns to the P-mode upon command and selects a final slide and quadrant which is projected upon the console screen to inform the patient that the printout of the history is complete and the examination has ended. The system is de-energized by removal of the patient identification card from the console and the system is now in condition for insertion of another ID card and the commencement of a new examination.

Although a particular embodiment of the invention has been described, the invention is not to be limited by the disclosed embodiment as various alternative implementation will occur to those versed in the art.

What is claimed is:

1. A medical history taking system for interrogating a patient and for recording and processing responses by the patient, said system comprising:

a console having a viewing screen and manually operable controls;

a plurality of photographic slides arranged for unique selection, each slide being divided into a plurality of sectors, each sector containing different information;

means for selecting any one of said slides and for selecting any one of the sectors of the selected slide;

means for projecting the information on the selected sector onto said viewing screen; and logic circuitry operative to control the sequence of selection of said slides and said sectors, at least part of said selection sequence being responsive to patient response data entered into said system by selective operation of said manually operable controls.

2. The system according to claim 1 wherein said logic circuitry includes:
a data processor;
means for storing patient response data; and
means for transferring said patient response data to said data processor.

3. The system according to claim 2 wherein:
said data processor is remote from said system; and further including
means for coupling said data processor to said system.

4. The system according to claim 1 wherein said manually operable controls includes:
a control for causing information to be presented on said viewing screen;
a control for changing the information presented on said viewing screen;
a plurality of controls, each representing a possible choice of patient responses.

5. The system according to claim 4 wherein said console further includes:
means operative to identify a patient using said system.

6. The system according to claim 5 wherein said identification means includes:
a card having patient identification symbols encoded therein; and
means operative to sense said encoded patient identification symbols and for enabling said system in response thereto.

7. The system according to claim 4 wherein said logic circuitry includes:
a shift register;
buffer means coupling said manually operable controls to said shift register;
projector control means; and
a slide projector buffer operative to transfer data from said shift register to said projector control means, said control means being operative to select one of said slides and one of the sectors of the selected slide.

8. The system according to claim 4 wherein said console further includes:
a plurality of lights individually associated with said manually operable controls, the operation of said lights in turn being individually controlled by said manually operable controls for indicating the condition of said controls at any given time.

9. The system according to claim 1 wherein said console includes:
a random access slide projector having a multiplicity of said photographic slides stored therein; and
a lens and shutter assembly mounted on said slide projector and adapted to project from said slide projector the information from a single sector of the selected slide.

10. The system according to claim 9 wherein said lens and shutter assembly includes:
a plurality of lenses equal in number to the number of sectors in each slide, each lens being arranged to cooperate with and focus one sector of each slide for projecting the information thereon from said slide projector; and
a plurality of shutter vanes adapted to prevent projection of any information from said slide projector and alternatively to selectively permit the projection of the information on one sector of the selected slide.

11. The system according to claim 10 wherein:
said logic circuitry controls the operation of said lens and shutter assembly so that said shutter vanes prevent projection of any information between each change of slide sectors.

12. The system according to claim 9 wherein:
said slide projector is remotely located from said viewing screen within said console; said console further comprising:
a mirror system for transmitting projected images from said slide projector to said viewing screen.

References Cited

UNITED STATES PATENTS

| | | |
|---|---|---|
| 3,184,714 | 5/1965 | Brown, Jr., et al. |
| 3,191,006 | 6/1965 | Avakian. |
| 3,225,652 | 12/1965 | Sauppe. |
| 3,308,439 | 3/1967 | Tink et al. |
| 3,332,071 | 7/1967 | Goldman et al. |
| 3,373,654 | 3/1968 | Carolan et al. |

PAUL J. HENON, Primary Examiner

H. E. SPRINGBORN, Assistant Examiner

U.S. Cl. X.R.

353—25

UNITED STATES PATENT OFFICE
CERTIFICATE OF CORRECTION

Patent No. 3,566,370                    Dated February 23, 1971

Inventor(s) Harvey R. Worthington, Jr. et al

It is certified that error appears in the above-identified patent and that said Letters Patent are hereby corrected as shown below:

Column 1, line 60, "links" should be --link--.

Column 2, line 26, "personel" should be --personnel--.

Column 5, line 11, "cemeneted" should be --cemented--.

Column 5, line 25, "on" should be --in--; after "any" insert --quadrant of the slide is quite similar to any--.

Column 6, line 1, "ments" should be --ment--.

Column 7, line 31, "commond" should be --command--.

Column 8, line 12, "provide" should be --provides--.

Signed and sealed this 21st day of December 1971.

(SEAL)
Attest:

EDWARD M. FLETCHER, JR.        ROBERT GOTTSCHALK
Attesting Officer              Acting Commissioner of Patents